United States Patent
Lin et al.

(10) Patent No.: US 11,165,336 B1
(45) Date of Patent: Nov. 2, 2021

(54) METHOD OF CONTROLLING TIME PARAMETER

(71) Applicant: INNO-TECH CO., LTD., Taipei (TW)

(72) Inventors: Shu-Chia Lin, Taipei (TW); Tsu-Huai Chan, Taipei (TW); Chih-Feng Lin, Taipei (TW)

(73) Assignee: INNO-TECH CO., LTD., Taipei (TW)

( * ) Notice: Subject to any disclaimer, the term of this patent is extended or adjusted under 35 U.S.C. 154(b) by 0 days.

(21) Appl. No.: 16/922,053

(22) Filed: Jul. 7, 2020

(30) Foreign Application Priority Data

Apr. 22, 2020 (TW) .................................. 109113485

(51) Int. Cl.
*H02M 1/42* (2007.01)
*H02M 1/08* (2006.01)

(52) U.S. Cl.
CPC ............... *H02M 1/42* (2013.01); *H02M 1/08* (2013.01)

(58) Field of Classification Search
CPC .................................. H02M 1/42; H02M 1/08
See application file for complete search history.

(56) References Cited

U.S. PATENT DOCUMENTS

| 9,780,670 | B2* | 10/2017 | Trevisan | H02M 3/33523 |
| 2004/0120090 | A1* | 6/2004 | Galli | H02M 1/32 |
| | | | | 361/115 |
| 2008/0170420 | A1* | 7/2008 | Yang | H02M 1/32 |
| | | | | 363/50 |
| 2017/0214323 | A1* | 7/2017 | Lin | H02M 1/32 |

* cited by examiner

*Primary Examiner* — Kyle J Moody
(74) *Attorney, Agent, or Firm* — Lin & Associates Intellectual Property, Inc.

(57) ABSTRACT

Disclosed is a method of controlling a time parameter performed by a power controller having a power pin, a ground pin, a driving pin, a time parameter selecting pin, a feedback pin, and a current sensing pin. The power controller is in collocation with a rectification unit, a transformer, a switch unit, a power output unit, and a feedback unit. A Pulse Width Modulation (PWM) frequency of a driving signal, an Over-Voltage Protection (OVP) delay time, and an Under-Voltage Protection (UVP) delay time are preset in the power controller. An external time parameter selecting signal is received through the time parameter selecting pin to dynamically update the PWM frequency, the OVP delay time, or the UVP delay time, thereby greatly increasing efficiency of power conversion and avoiding malfunction of OVP or UVP.

9 Claims, 8 Drawing Sheets

METHOD OF CONTROLLING TIME PARAMETER

CROSS-REFERENCE TO RELATED APPLICATION

This application claims the priority of Taiwanese patent application No. 109113485, filed on Apr. 22, 2020, which is incorporated herewith by reference.

BACKGROUND OF THE INVENTION

1. Field of the Invention

The present invention generally relates to a method of controlling a time parameter, and more specifically to a method of controlling time parameter by receiving an external time parameter selecting signal through a time parameter selecting pin to dynamically update a Pulse Width Modulation frequency, an Over-Voltage Protection (OVP) delay time, or an Under-Voltage Protection (UVP) delay time, thereby greatly increasing efficiency of power conversion and avoiding malfunction of OVP or UVP.

2. The Prior Arts

In the current field of switching power supply, Pulse Width Modulation (PWM) is one of the most widely used schemes. Specifically, the power controller needs to well control the output voltage and current of the power supply, and many kinds of protection measures are also implemented to prevent the power supply from over current, short circuit, over voltage, or over temperature due to incorrect usage or abnormal operation.

As well known, the power controller generates the PWM driving signal to drive the switch unit like power transistor connected to the transformer such that the switch unit is periodically and fast turned on/off and the current of the switch unit is accordingly conducted or cut off. The PWM frequency of the PWM driving signal is internally preset by a fixed value. That is, the PWM frequency is a fixed frequency, and not allowed to change for various environments. The application is thus quite limited. To overcome this problem, some manufactures have developed some schemes to update and set the PWM frequency. For instance, the power controller receives the updated parameter from an external device through transmission interface such as Inter-Integrated Circuit (I2C) or Universal Serial Bus (USB), stores the parameter to the specific register, and then sets the PWM frequency based on the parameter. However, the power controller needs to include the additional interface unit to connected to the external device for data transfer, and the overall design is thus complicated and hard to economically implement, In addition, the power controller needs to build appropriate delay features for the protection operation to avoid malfunction due to electrical interference from external noise. That is, the protection operation like Over-Voltage Protection (OVP) or Under-Voltage Protection (UVP) is invoked only after a preset delay time. For example, the traditional power controller is provided with a specific input pin usually called a time parameter pin, and the time parameter pin is connected to the ground level through an external resistor called a selecting resistor. A specific current controlled by the power controller flows through the time parameter pin and the selecting resistor to the ground level, and an voltage called a time parameter signal as an analog signal is generated at the connection point of the time parameter pin and the selecting resistor for setting the desired time parameter such as OVP delay time or UVP delay time. Alternatively, the PWM frequency is set by the time parameter signal.

However, the power controller needs more additional pins and the application circuit has to provide the external resistors to connect the additional pins, respectively. For example, a PWM frequency pin is provided for a PWM frequency resistor, an OVP delay pin for an OVP delay resistor, or a UVP delay pin for a UVP delay resistor. It is obvious that the pin number of the power controller is increased, and the resistors further occupy the effective and limited area of the circuit board. In particular, the time parameter is changed only by physically changing the respective resistor. As a result, it is difficult to update the time parameter, and the overall cost is increased.

Therefore, it is greatly needed to provide a new method of controlling a time parameter by receiving an external time parameter selecting signal through a time parameter selecting pin to dynamically update a Pulse Width Modulation frequency, an Over-Voltage Protection (OVP) delay time, or an Under-Voltage Protection (UVP) delay time for greatly increasing efficiency of power conversion and avoiding malfunction of OVP or UVP, thereby overcoming the above problems in the prior arts.

SUMMARY OF THE INVENTION

The primary object of the present invention is to provide a method of controlling a time parameter. The method is specifically performed by a power controller provided with a power pin, a ground pin, a driving pin, a time parameter selecting pin, a feedback pin, and a current sensing pin. The power controller is in collocation with a rectification unit, a transformer, a switch unit, a power output unit, and a feedback unit, to operate, and particularly has a Pulse Width Modulation (PWM) frequency of a driving signal, an Over-Voltage Protection (OVP) delay time, and an Under-Voltage Protection (UVP) delay time preset.

Specifically, the method comprises: a step S10 imposing a time parameter selecting signal on the time parameter selecting pin, the time parameter selecting signal having a level assigned by one of at least two time parameter levels; a step S20 receiving the time parameter selecting signal through the time parameter selecting pin; a step S30 setting a time parameter based on the time parameter selecting signal; a step S40 updating one of the PWM frequency, the OVP delay time, and the UVP delay time based on the time parameter; and a step S50 generating the driving signal based on the PWM frequency, delaying an OVP operation based on the OVP delay time, or delaying a UVP operation based on the UVP delay time.

Further, the driving signal of the power controller is sent to the driving pin, the power pin is connected to an input power, the ground pin is connected to a ground level, the driving pin is connected to a gate of the switch unit, the feedback pin is connected to an end of the feedback unit, and the current sensing pin is connected to a source of the switch unit. Also, another pin of the feedback unit is connected to the power output unit, and the feedback unit generates a feedback voltage corresponding to an output power generated by the power output unit.

Additionally, an end of a current sensing resistor is connected to the source, another end of the current sensing resistor is connected to the ground level, the current sensing pin generates a current sensing voltage, the rectification unit receives and converts an external input power into a rectification power, and the input power is generated by a voltage division unit receiving the external input power and performing a voltage division and regulation process.

The transformer comprises a first side winding and a second side winding, an end of the first side winding is connected to the rectification unit for receiving the rectification power, another end of the first side winding is connected to a drain of the switch unit, and an end of the second side winding is connected to the power output unit, the power output unit is connected to a load.

More specifically, the above OVP operation comprises stopping the driving signal when the feedback voltage is higher than an OVP voltage and lasts for more than the OVP delay time, and the UVP operation comprises stopping the driving signal when the feedback voltage is higher than an UVP voltage and lasts for more than the UVP delay time.

In particular, the power controller is implemented by an integrated circuit (IC) through a semiconductor manufacturing process, and the IC comprises a digital circuit to execute the steps of the method of controlling a time parameter.

Therefore, the external time parameter selecting signal is received by the time parameter selecting pin to update the optimal PWM frequency, OVE delay time, or UVP delay time, thereby greatly increasing efficiency of power conversion and avoiding malfunction of OVP or UVP.

Another object of the present invention is to provide a method of controlling time parameter performed by a power controller to implement a function of Power Factor Correction (PFC). The power controller has a PFC PWM frequency of a PFC driving signal, a PFC Over-Voltage Protection (OVP) delay time, and a PFC Under-Voltage Protection (UVP) delay time preset, and is specifically provided with a power pin, a ground pin, a PFC time parameter selecting pin, a PFC current sensing pin, a PFC voltage sensing pin, and a PFC driving pin. The power controller is further in collocation with a rectification unit and a PFC unit to operate.

Specifically, the method comprises: a step S60 imposing a PFC time parameter selecting signal on the PFC time parameter selecting pin, the PFC time parameter selecting signal having a level assigned by one of at least two time parameter levels; a step S70 receiving the PFC time parameter selecting signal through the PFC time parameter selecting pin; a step S80 setting a PFC time parameter based on the PFC time parameter selecting signal; a step S90 updating one of the PFC PWM frequency, the PFC OVP delay time, and the PFC UVP delay time based on the PFC time parameter; and a step S100 generating the PFC driving signal based on the PFC PWM frequency, delaying a PFC OVP operation based on the PFC OVP delay time, or delaying a PFC UVP operation based on the PFC UVP delay time.

Further, the PFC driving signal is sent to the PFC driving pin, the power pin is connected to an input power, the ground pin is connected to a ground level, the rectification unit receives and converts an external input power into a rectification power, the PFC unit is connected to the rectification unit to receive and convert the rectification power into a PFC power, and the input power is generated by a voltage division unit receiving the external input power and performing a voltage division and regulation process.

More specifically, the PFC unit comprises a PFC inductor, a PFC auxiliary winding, a PFC switch unit, a PFC current sensing resistor, a PFC diode, and a PFC filter capacitor.

The PFC driving pin is connected to a gate of the PFC switch unit, the PFC current sensing pin is connected to a source of the PFC switch unit, an end of the PFC current sensing resistor is connected to the source, another end of the PFC current sensing resistor is connected to the ground level, the PFC current sensing pin generates a PFC current sensing signal, an end of the PFC inductor is connected to the rectification unit for receiving the rectification power, another end of the PFC inductor is connected to a drain of the PFC switch unit and a positive end of the PFC diode, a negative end of the PFC diode is connected to an end of the PFC filter capacitor, and another end of the PFC filter capacitor is connected to the ground level, the negative end of the PFC diode generates the PFC power.

Moreover, an end of the PFC auxiliary winding is connected to the PFC voltage sensing pin, another end of the PFC auxiliary winding is connected to the ground level, the PFC auxiliary winding is coupled with the PFC inductor to generate and transfer a PFC voltage sensing signal to the PFC voltage sensing pin, a turn on auxiliary voltage corresponding to the rectification power is assigned by the PFC voltage sensing signal when the PFC switch is turned on, and a turn off auxiliary voltage corresponding to the PFC power is assigned by the PFC voltage sensing signal when the PFC switch is turned off.

The above PFC OVP operation comprises stopping the PFC driving signal when the PFC voltage sensing signal served as the turn off auxiliary voltage is higher than a PFC OVP voltage and lasts for more than the PFC OVP delay time.

Also, the PFC UVP operation comprises stopping the PFC driving signal when the PFC voltage sensing signal served as the turn off auxiliary voltage is higher than a PFC UVP voltage and lasts for more than the PFC UVP delay time.

Therefore, the external PFC time parameter selecting signal is received by the PFC time parameter selecting pin to update the optimal PFC PWM frequency, PFC OVE delay time, or PFC UVP delay time, thereby greatly increasing efficiency of PFC operation and avoiding malfunction of PFC OVP or PFC UVP.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENT

The present invention may be embodied in various forms and the details of the preferred embodiments of the present invention will be described in the subsequent content with reference to the accompanying drawings. The drawings (not to scale) show and depict only the preferred embodiments of the invention and shall not be considered as limitations to the scope of the present invention. Modifications of the shape of the present invention shall too be considered to be within the spirit of the present invention.

Figure 1:
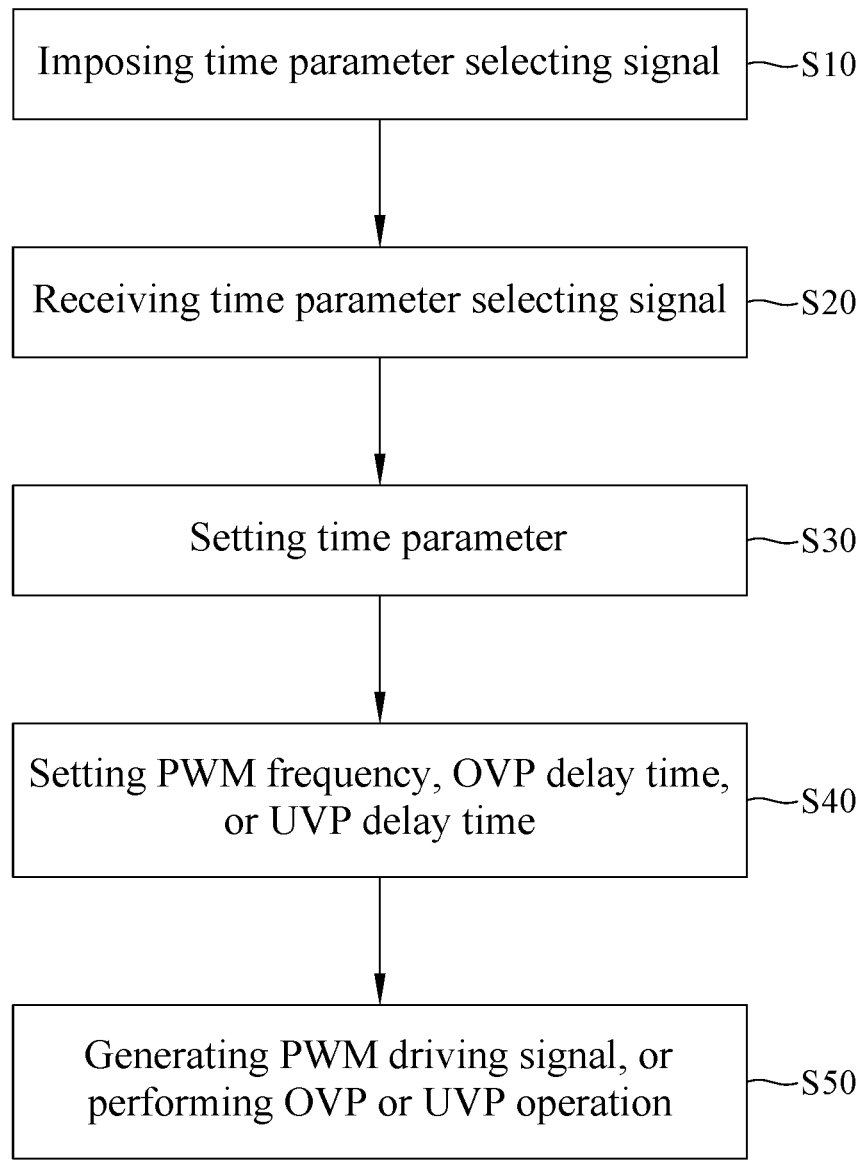
FIG. 1 is a flowchart of the method of controlling a time parameter according to the first embodiment of the present invention.
Figure 2:
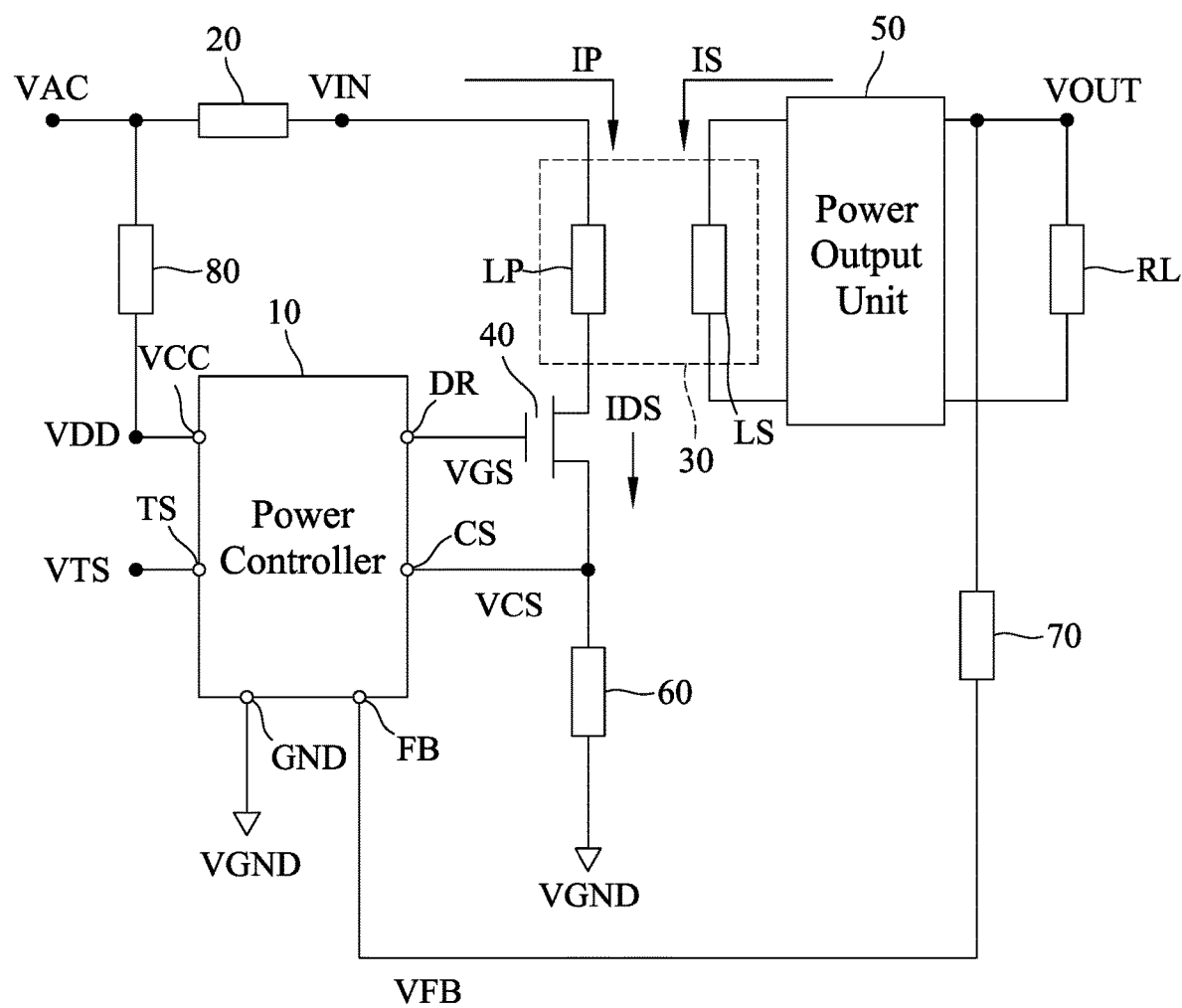
FIG. 2 is a view showing one illustrative application of the method according to the first embodiment of the present invention.

Please refer to FIGS. 1 and 2. FIG. 1 is a flowchart of the method of controlling a time parameter according to the first embodiment of the present invention, and FIG. 2 is a view showing one illustrative application of the method according to the first embodiment. As shown in FIGS. 1 and 2, the method of controlling the time parameter r according to the first embodiment is performed by a power controller 10. The power controller 10 is provided with a power pin VCC, a ground pin GND, a driving pin DR, a time parameter selecting pin TS, a feedback pin FB, and a current sensing pin CS, and further in collocation with a rectification unit 20, a transformer 30, a switch unit 40, a power output unit 50, and a feedback unit 70 to operate.

In particular, the power controller 10 has a Pulse Width Modulation (PWM) frequency of a driving signal VGS, an Over-Voltage Protection (OVP) delay time, and an Under-Voltage Protection (UVP) delay time preset.

For example, the power controller 10 is implemented by a microcontroller (MCU), and the switch unit 40 is implemented by a Metal-Oxide-Semiconductor (MOS) transistor, a Gallium Nitride field effect transistor (GaN FET), or a silicon carbide (SiC)-MOSFET.

Specifically, the power pin VCC of the power controller 10 is connected to an input power VDD, the ground pin GND is connected to a ground level VGND, the driving pin DR is connected to a gate of the switch unit 40, the feedback pin FB is connected to an end of the feedback unit 70, and the current sensing pin CS is connected to a source of the switch unit 40.

Also, another pin of the feedback unit 70 is connected to the power output unit 50, and the feedback unit 70 generates a feedback voltage VFB corresponding to an output power VOUT generated by the power output unit 50. For example, the feedback unit 70 comprises a photo coupler for implementing a function of an isolation power conversion, or the feedback unit comprises 70 a resistive voltage divider for implementing a function of a non-isolation power conversion.

Further, an end of a current sensing resistor 60 is connected to the source of the switch unit 40, another end of the current sensing resistor 60 is connected to the ground level VGND, and the current sensing pin CS thus generates a current sensing voltage VCS.

In addition, the rectification unit 20 receives and converts an external input power VAC into a rectification power VIN, and the input power VDD is generated by a voltage division unit 80 receiving the external input power VAC and performing a voltage division and regulation process.

The transformer 30 substantially comprises a first side winding LP and a second side winding LS, an end of the first side winding LP is connected to the rectification unit 20 for receiving the rectification power VIN, another end of the first side winding LP is connected to a drain of the switch unit 40, and an end of the second side winding LS is connected to the power output unit 50, and the power output unit 50 is connected to a load RL.

More specifically, the method of controlling a time parameter according to the first embodiment of the present invention comprises steps S10, S20, S30, S40, and S50 sequentially performed. In the step S10, a time parameter selecting signal VTS is imposed on the time parameter selecting pin TS, and the time parameter selecting signal VTS has a level assigned by one of at least two time parameter levels. For example, the level of the time parameter selecting signal VTS is a logic high level or a logic low level, and the logic high level and the logic low level are usually the input power VDD and the ground level VGND, respectively. However, the above example is only illustrative and not intended to limit the scope of the present invention. In other words, the level of the time parameter selecting signal VTS is alternatively one of the plurality of discrete levels like 128 levels, which are equally spaced from the input power VDD to the ground level VGND.

In the step S20, the time parameter selecting signal VTS is received through the time parameter selecting pin TS, and in the step S30, a time parameter is set according to the time parameter selecting signal VTS. Then, the step S40 is performed by updating one of the PWM frequency, the OVP delay time, and the UVP delay time based on the time parameter.

Finally, the step S50 is performed by generating the driving signal VGS based on the PWM frequency, delaying an OVP operation based on the OVP delay time, or delaying a UVP operation based on the UVP delay time.

Specifically, the above OVP operation comprises stopping the driving signal VGS when the feedback voltage VFB is higher than an OVP voltage and lasts for more than the OVP delay time, and the UVP operation comprises stopping the driving signal VGS when the feedback voltage VFB is higher than an UVP voltage and lasts for more than the UVP delay time. Additionally, the driving signal VGS is sent to the driving pin DR to drive the gate of the switch unit 40.

It should be noted that the power controller 10 is implemented by an integrated circuit (IC) through a semiconductor manufacturing process, and the IC comprises a digital circuit to execute the steps of the method of controlling the time parameter.

It is preferred that the power controller 10 is a microcontroller (MCU), which executes a specific firmware to implement the desired function. However, it is not intended to limit the scope of the present invention, and a hardware circuit without firmware is also included.

Figure 3:
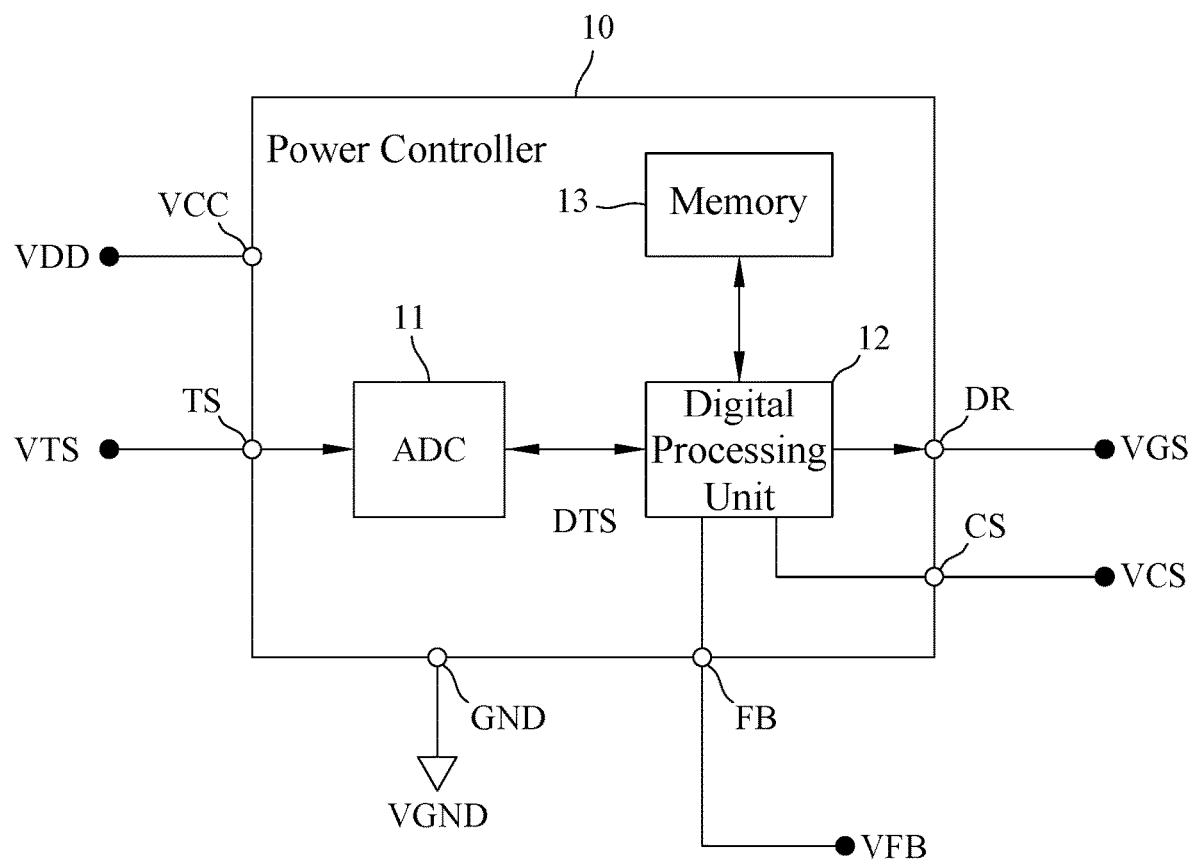
FIG. 3 is a view showing the functional blocks of one example of power controller performing the method according to the first embodiment of the present invention.

For instance, the power controller 10 as shown in FIG. 3 comprises an Analog-to-Digital Converter (ADC) 11, a logic processing core unit 12, and a memory 13, and the logic processing core unit 12 is electrically connected to the ADC 11 and the memory 13.

The ADC 11 receives the time parameter selecting signal VTS from the time parameter selecting pin TS, and converts the time parameter selecting signal VTS into a time parameter selecting digital signal DTS comprising at least one bit. The memory 13 stores the firmware code. The logic processing core unit 12 fetches and execute the firmware code from the memory 13 to fulfill the method of controlling the time parameter, which comprises receiving the time parameter selecting digital signal DTS to update the PWM frequency, the OVP delay time, or the UVP delay time, generating the driving signal VGS to drive the switch unit 40 for power conversion, and further performing the OVP operation and the UVP operation based on the updated OVP delay time and the updated UVP delay time, respectively, to implement the protection function of OVP and UVP, thereby avowing malfunction and improving operation reliability, stability, and safety.

Figure 4:
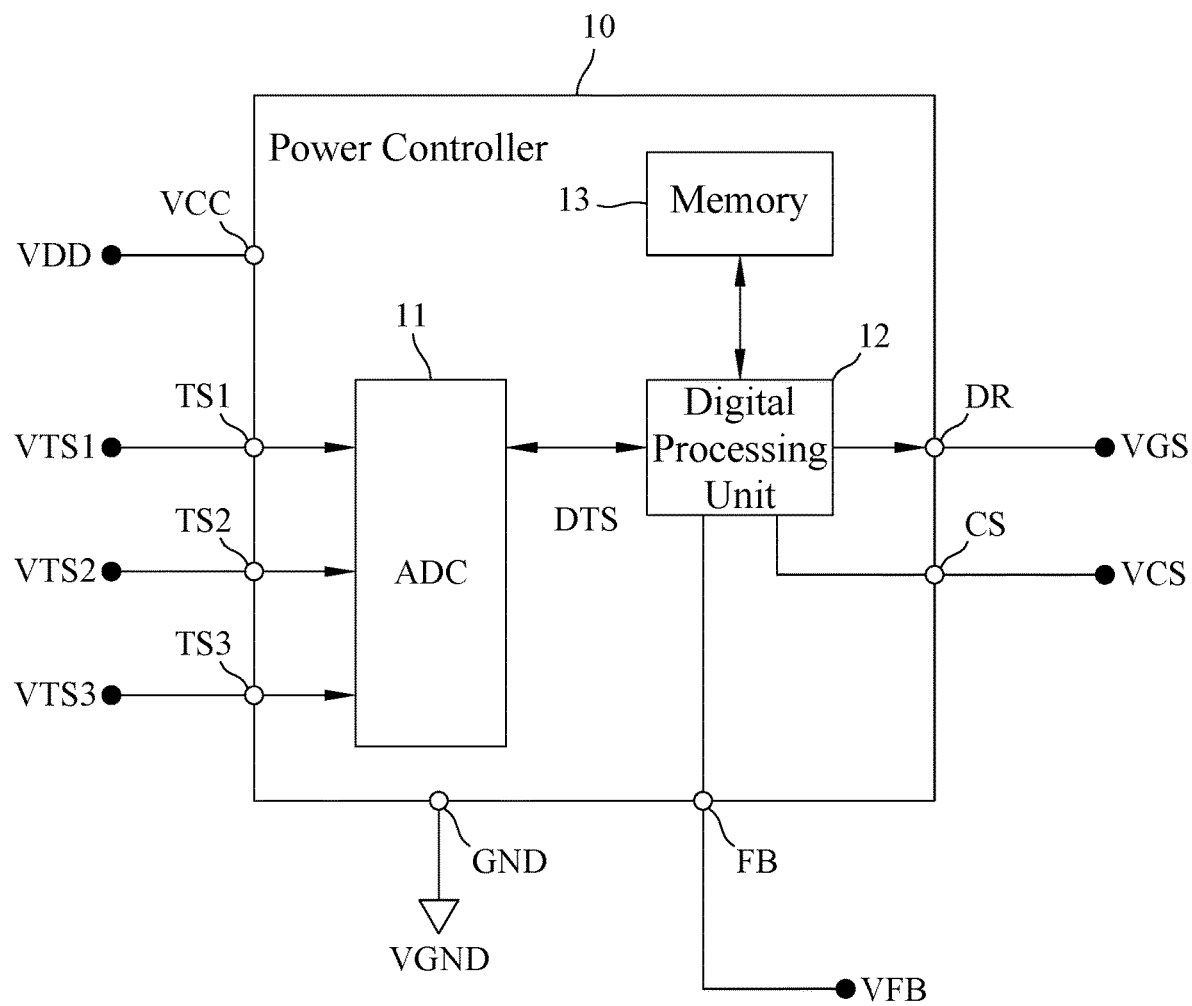
FIG. 4 is a view showing the functional blocks of another example of power controller performing the method according to the first embodiment of the present invention.

Further refer to FIG. 4 illustrating the functional blocks of another example of power controller performing the method according to the first embodiment of the present invention. The power controller 10 substantially is provided with a plurality of time parameter selecting pins like three time parameter selecting pins TS1, TS2, and TS3 for respectively receiving different time parameter selecting signals like three time parameter selecting signals VTS1, VTS2, and VTS3, which are generated and transmitted by a system main chip (not shown). In other words, the power controller 10 executes the firmware code to simultaneously convert the three time parameter selecting signals VTS1, VTS2, and VTS3 into the time parameters for setting the PWM frequency, the OVP delay time, and the UVP delay time. Since the three time parameter selecting signals VTS1, VTS2, and VTS3 are directly transferred to the power controller 10 through the three time parameter selecting pins TS1, TS2, and TS3 without any packets or specific transmission protocol, the method of controlling the time parameter is easy to implement and has industrial utility and competitiveness.

Moreover, the power controller 10 as shown in FIG. 4 is provided with just one ADC 11 for sequentially converting the three time parameter selecting signals VTS1, VTS2, and VTS3 into digital signals for the logic processing core unit 12 to set the time parameters. However, the power controller 10 can be provided with a plurality of ADCs like three ADCs for simultaneously converting the three time parameter selecting signals VTS1, VTS2, and VTS3. That is, the analog-to-digital conversion rate is increased up to three times.

From the above mention, one aspect of the first embodiment according to present invention is that the external time parameter selecting signal is received through the time parameter selecting pin to dynamically update the optimal frequency, the OVP delay time, or the UVP delay time, thereby greatly increasing efficiency of power conversion and avoiding malfunction of OVP or UVP.

Another aspect of the first embodiment according to present invention is that the power controller is provided with a plurality of time parameter selecting pins to simultaneously receive a plurality of time parameter selecting signals to set a plurality of time parameters for greatly simplify the design and layout of the application circuit.

Figure 5:
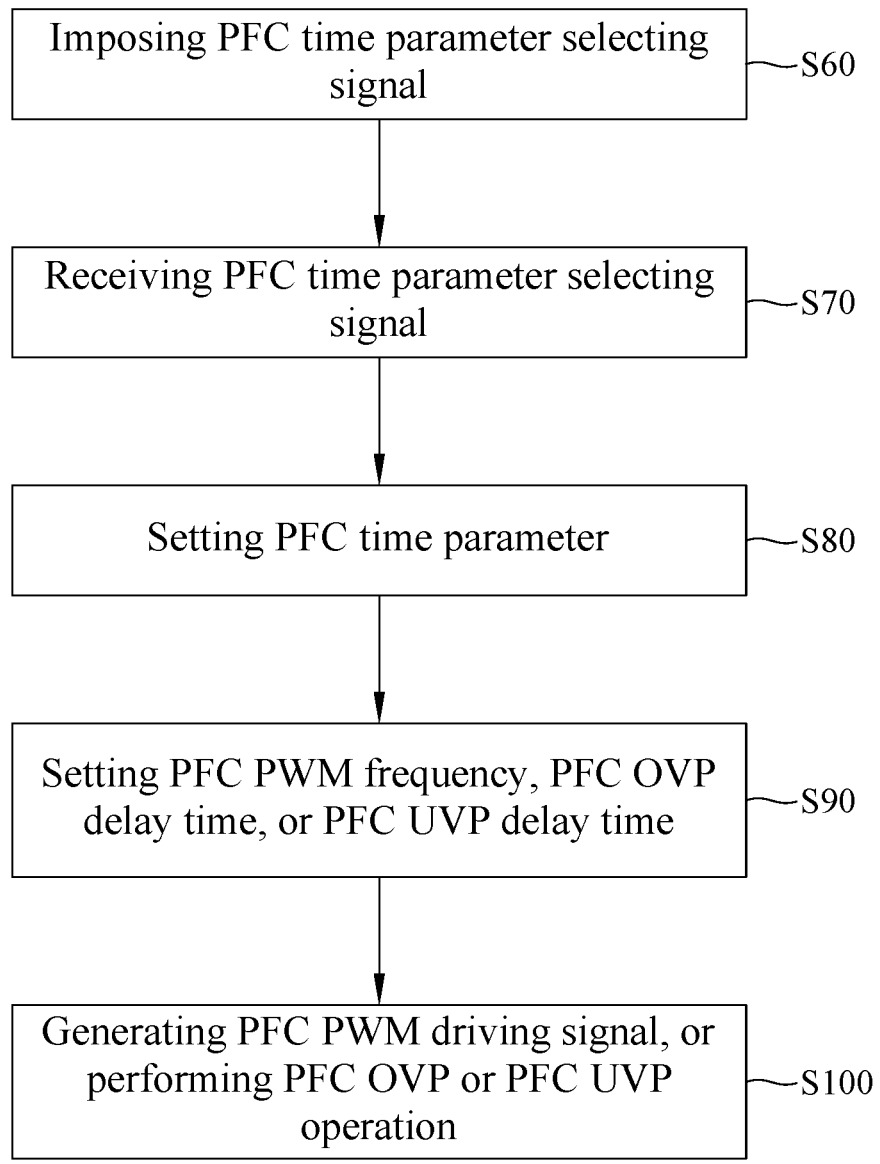
FIG. 5 is a view showing the operation flowchart of the method of controlling a time parameter according to the second embodiment of the present invention.
Figure 6:
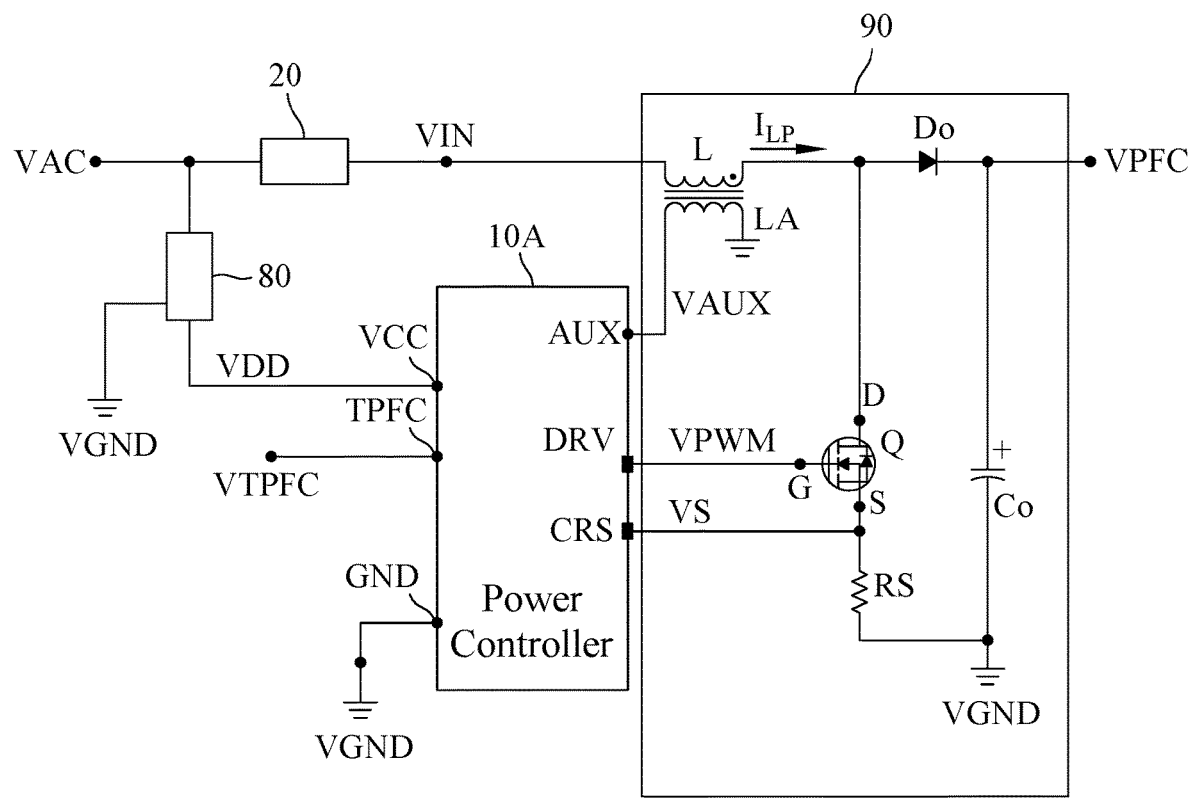
FIG. 6 is a view showing one illustrative application of the method according to the second embodiment of the present invention.

Moreover, refer to FIGS. 5 and 6. FIG. 5 is a view showing the operation flowchart of the method of controlling a time parameter according to the second embodiment of the present invention, and FIG. 6 is a view showing one illustrative application of the method according to the second embodiment of the present invention. As shown in FIGS. 5 and 6, the method of controlling a time parameter according to the second embodiment comprises the steps S60, S70, S80, S90, and S100 sequentially performed by the power controller 10A for implementing a function of Power Factor Correction (PFC). The power controller 10A comprises a power pin VCC, a ground pin GND, a PFC driving pin DRV, a PFC time parameter selecting pin TPFC, a PFC voltage sensing pin AUX, and a PFC current sensing pin CRS. In particular, the power controller 10A is in collocation with a rectification unit 20 and a PFC unit 90 to operate. Further, the power controller 10A has a PFC PWM frequency of a PFC driving signal VPWM, a PFC OVP delay time, and a PFC UVP delay time preset.

The above PFC driving signal VPWM is sent to the PFC driving pin DRV, the power pin VCC is connected to an input power VDD, and the ground pin GND is connected to a ground level VGND.

Additionally, the rectification unit 20 receives and converts an external input power VAC into a rectification power VIN, and the PFC unit 90 is connected to the rectification unit 20 to receive and convert the rectification power VIN into a PFC power VPFC. The input power VDD is generated by a voltage division unit 80 receiving the external input power VAC and performing a voltage division and regulation process.

Specifically, the above PFC unit 90 comprises a PFC inductor L, a PFC auxiliary winding LA, a PFC switch unit Q, a PFC current sensing resistor RS, a PFC diode Do, and a PFC filter capacitor Co. For example, the PFC switch unit Q is implemented by a MOS transistor, a GaN FET, or a SiC-MOSFET.

Furthermore, the PFC driving pin DRV is connected to a gate G of the PFC switch unit Q, the PFC current sensing pin CRS is connected to a source S of the PFC switch unit Q, an end of the PFC current sensing resistor RS is connected to the source S, and another end of the PFC current sensing resistor RS is connected to the ground level VGND. Also, the PFC current sensing pin RCS generates a PFC current sensing signal VS.

Additionally, an end of the PFC inductor L is connected to the rectification unit 20 for receiving the rectification power VIN, another end of the PFC inductor L is connected to a drain D of the PFC switch unit Q and a positive end of the PFC diode Do, a negative end of the PFC diode Do is connected to an end of the PFC filter capacitor Co, and another end of the PFC filter capacitor Co is connected to the ground level VGND. In particular, the negative end of the PFC diode Do generates the PFC power VPFC as desired.

Moreover, an end of the PFC auxiliary winding LA is connected to the PFC voltage sensing pin AUX, another end of the PFC auxiliary winding LA is connected to the ground level VGND, and the PFC auxiliary winding LA is coupled with the PFC inductor L to generate and transfer a PFC voltage sensing signal VAUX to the PFC voltage sensing pin AUX.

More specifically, the PFC driving signal VPWM for driving the PFC switch unit Q is similar to the driving signal VGS for driving the switch unit 40 in the first embodiment, and accordingly gas a PFC PWM frequency.

The method of controlling a time parameter according to the second embodiment begins at the step S60, and a PFC time parameter selecting signal VTPFC is imposed on the PFC time parameter selecting pin VTPFC. Similar to the time parameter selecting signal VTS in the first embodiment, the PFC time parameter selecting signal VTPFC has a level assigned by one of at least two time parameter levels.

Then in the step S70, the PFC time parameter selecting signal VTPFC is received, and in the step S80, a PFC time parameter is set according to the PFC time parameter selecting signal VTPFC.

In the step S90, one of the PFC PWM frequency, the PFC OVP delay time, and the PFC UVP delay time is updated according to the PFC time parameter, and finally in the step S100, the PFC driving signal VPWM is generated according to the PFC PWM frequency, a PFC OVP operation is delayed according to the PFC OVP delay time, or a PFC UVP operation is delayed according to the PFC UVP delay time.

The above PFC OVP operation comprises stopping the PFC driving signal VPWM when the PFC voltage sensing signal VAUX served as the turn off auxiliary voltage is higher than an PFC OVP voltage and lasts for more than the PFC OVP delay time, and the PFC UVP operation comprises stopping the PFC driving signal VPWM when the PFC voltage sensing signal VAUX served as the turn off auxiliary voltage is higher than a PFC UVP voltage and lasts for more than the PFC UVP delay time. In particular, the purpose of stopping the PFC driving signal VPWM is to provide protection to prevent the electrical elements or the whole system from damage or failure.

Further, a turn on auxiliary voltage corresponding to the rectification power VIN is assigned by the PFC voltage sensing signal VAUX when the PFC switch Q is turned on, and a turn off auxiliary voltage is assigned by the PFC voltage sensing signal VAUX when the PFC switch Q is turned off, wherein the turn off auxiliary voltage is in collocation with the turn on auxiliary voltage to correspond to the PFC power VPFC.

It should be noted that the power controller 10A of the second embodiment is similar to the power controller 10 of the first embodiment in the functional blocks as shown in FIGS. 3 and 4, and can be provided with a plurality of PFC time parameter selection pins instead of single one PFC time parameter selection pin. The difference between the power controller 10A and the power controller 10 is that the power controller 10 of the first embodiment is provided with the feedback pin FB in collocation with the feedback unit 70 for controlling the driving signal VGS and achieving power conversion, but the power controller 10A of the second embodiment is provided with the PFC voltage sensing signal VAUX instead of the feedback pin FB for sensing the external input power VAC or the rectification power VIN, and simultaneously detecting the PFC power VPFC so as to control the PFC driving signal VPWM for achieving PFC function.

Figure 7:
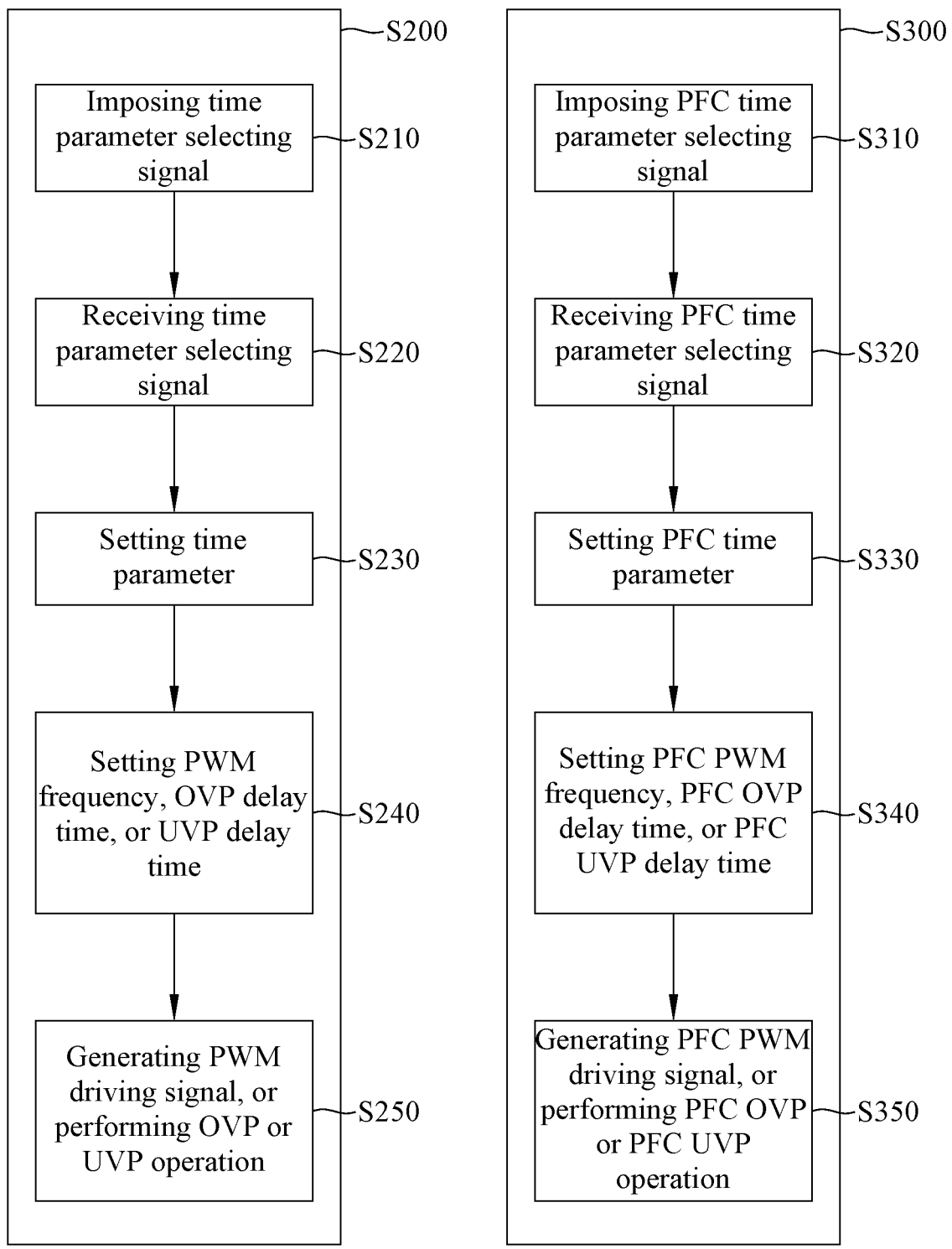
FIG. 7 is a view showing the operation flowchart of the method of controlling a time parameter according to the third embodiment of the present invention.
Figure 8:
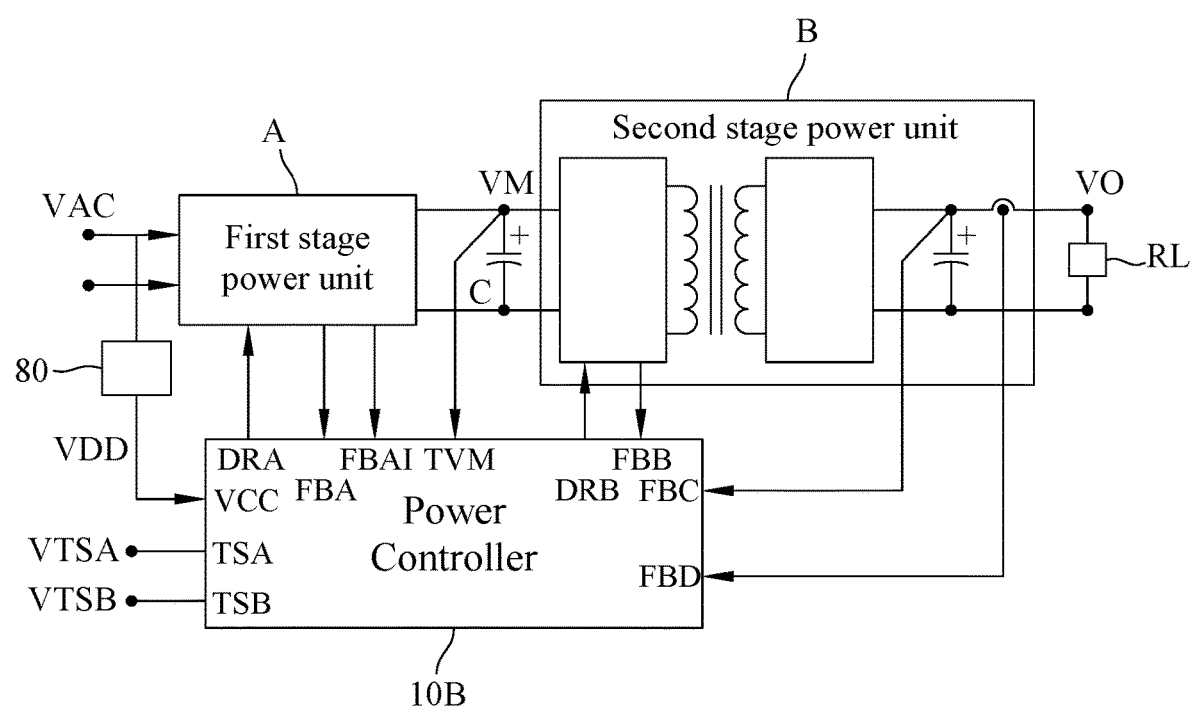
FIG. 8 is a view showing one illustrative application of the method according to the third embodiment of the present invention.

Further refer to FIGS. 7 and 8. FIG. 7 is a view showing the operation flowchart of the method of controlling a time parameter according to the third embodiment of the present invention, and FIG. 8 is a view showing one illustrative application of the method according to the third embodiment of the present invention. As shown in FIGS. 7 and 8, the method according to the third embodiment comprises the steps S200 and S300 performed by the power controller 10B in collocation with a first stage power unit A, a second stage power unit B, a filter capacitor C, and a voltage division unit 80 for converting the external input power VAC into the output power VO to supply the load RL. In particular, the step S200 is dedicated for the first stage power unit A, and the step S300 for the second stage power unit B.

For example, the first stage power unit A is implemented by the PFC unit in the second embodiment, and the second stage power unit B is implemented by integrating the transformer 30, the switch unit 40, the power output unit 50, and the feedback unit 70 in the first embodiment. However, the above mentioned is only illustrative and not intended to limit the scope of the present invention.

Substantially, the step S200 comprises the steps S210, S220, S230, S240, and S250 corresponding to the steps S60, S70, S80, S90, and S100 of the second embodiment shown in FIG. 5, respectively, and the step S300 comprises the steps S310, S320, S330, S340, and S350 corresponding to the steps S10, S20, S30, S40, and S50 of the first embodiment shown in FIG. 1, respectively. Thus, the detailed operation for the steps S210, S220, S230, S240, S250, S310, S320, S330, S340, and S350 are not described hereinafter. It should be noted that the power controller 10B of the third embodiment can be considered as the integration of the power controller 10 of the first embodiment and the power controller 10A of the second embodiment. Particularly, the step S200 and the step S300 can be independently performed, that is, the power controller 10B able to simultaneously control the first stage power unit A and the second stage power unit B for achieving corresponding functions.

In addition, the power controller 10B of the third embodiment is provided with a first driving pin DRA, a second driving pin DRB, a first sensing pin FBA, a first auxiliary sensing pin FBA1, a second sensing pin FBB, a second auxiliary sensing pin FBA2, a first time parameter selecting pin TSA, a second time parameter selecting pin TSB, and a middle voltage sensing pin TVM. The first time parameter selecting pin TSA and the second time parameter selecting pin TSB are intended to receive a first time parameter selecting signal VTSA and a second time parameter selecting signal VTSB, respectively. The first driving pin DRA, the first sensing pin FBA, and the first auxiliary sensing pin FBA1 are connected to the first stage power unit A, and the second driving pin DRB, the second sensing pin FBB, and the second auxiliary sensing pin FBA2 are connected to the second stage power unit B. In addition, the middle voltage sensing pin TVM is connected to the connection point of the first stage power unit A and the second stage power unit B for sensing a middle power VM, which is generated by the first stage power unit A and transferred to the second stage power unit B.

Also, the power controller 10B of the third embodiment further comprises a third sensing pin FBC and a fourth sensing pin FBD for sensing the out voltage and the output current of the second stage power unit B, respectively, to provide the power controller 10B for proceed feedback control like an isolation or non-isolation scheme.

More specifically, the first time parameter selecting pin TSA, the first driving pin DRA, the first sensing pin FBA, and the first auxiliary sensing pin FBA1 of the power controller 10B of the third embodiment correspond to the PFC time parameter selecting pin TPFC, the PFC driving pin DRV, the PFC current sensing pin CRS, and the PFC voltage sensing pin AUX of the power controller 10A of the second embodiment, respectively, and the second time parameter selecting pin TSB, the second driving pin DRB, the second sensing pin FBB, and the third sensing pin FBC of the power controller 10B of the third embodiment correspond to the driving pin DR, the current sensing pin CS, and the feedback pin FB of the power controller 10 of the first embodiment, respectively.

It should be noted that the filter capacitor C of the third embodiment is substantially similar to the filter capacitor Co of the power controller 10A in the second embodiment. That is, the filter capacitor C can be included in the power controller 10B. However, the filter capacitor C with large capacitance externally connected between the power controllers 10A and 10B as shown in FIG. 8 is preferred to further enhance operation stability and filter function. This is because it is difficult for the semiconductor process to build a large capacitor and the area of the chip is considerably increased.

In short, the aspect of the third embodiment is that the method of controlling a time parameter performed by the power controller 10B can simultaneously and discretely control the first stage power unit A and the second stage power unit B to operate for achieving the respective function as desired. In particular, the first time parameter selecting signal VTSA and the second time parameter selecting signal VTSB from the first time parameter selecting pin TSA and the second time parameter selecting pin TSB are utilized to set the time parameters required by the step S200 and S300 to meet the actual requirement and further expand the field of application.

Overall, one of the key aspects of the present invention is that the power control in collocation with external electrical elements performs the specific operational steps to implement power conversion and process, and in particular, the time parameter selecting pin is provided for setting the time parameter as desired by the operational steps, thereby meeting various electrical environments, easily adjusting the time parameter, expanding the field of application, and achieving optimal performance.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method of controlling a time parameter performed by a power controller with a Pulse Width Modulation (PWM) frequency of a driving signal, an Over-Voltage Protection (OVP) delay time, and an Under-Voltage Protection (UVP) delay time preset, the power controller in collocation with a rectification unit, a transformer, a switch unit, a power output unit, and a feedback unit, the power controller having a power pin, a ground pin, a driving pin, a time parameter selecting pin, a feedback pin, and a current sensing pin, the method comprising:

a step (S10) imposing a time parameter selecting signal on the time parameter selecting pin, the time parameter selecting signal having a level assigned by one of at least two time parameter levels;

a step (S20) receiving the time parameter selecting signal through the time parameter selecting pin;

a step (S30) setting a time parameter based on the time parameter selecting signal;

a step (S40) updating one of the PWM frequency, the OVP delay time, and the UVP delay time based on the time parameter; and a step (S50) generating the driving signal based on the PWM frequency, delaying an OVP operation based on the OVP delay time, or delaying a UVP operation based on the UVP delay time, wherein the driving signal is sent to the driving pin, the power pin is connected to an input power, the ground pin is connected to a ground level, the driving pin is connected to a gate of the switch unit, the feedback pin is connected to an end of the feedback unit, the current sensing pin is connected to a source of the switch unit, another pin of the feedback unit is connected to the power output unit, the feedback unit generates a feedback voltage corresponding to an output power generated by the power output unit, an end of a current sensing resistor is connected to the source, another end of the current sensing resistor is connected to the ground level, the current sensing pin generates a current sensing voltage, the rectification unit receives and converts an external input power into a rectification power, the input power is generated by a voltage division unit receiving the external input power and performing a voltage division and regulation process, the transformer comprises a first side winding and a second side winding, an end of the first side winding is connected to the rectification unit for receiving the rectification power, another end of the first side winding is connected to a drain of the switch unit, an end of the second side winding is connected to the power output unit, the power output unit is connected to a load, the OVP operation comprises stopping the driving signal when the feedback voltage is higher than an OVP voltage and lasts for more than the OVP delay time, and the UVP operation comprises stopping the driving signal when the feedback voltage is higher than an UVP voltage and lasts for more than the UVP delay time.

2. The method as claimed in claim 1, wherein the switch unit is implemented by a Metal-Oxide-Semiconductor (MOS) transistor, a Gallium Nitride field effect transistor (GaN FET), or a silicon carbide (SiC)-MOSFET.

3. The method as claimed in claim 1, wherein the feedback unit comprises a photo coupler for implementing a function of an isolation power conversion.

4. The method as claimed in claim 1, wherein the feedback unit comprises a resistive voltage divider for implementing a function of a non-isolation power conversion.

5. The method as claimed in claim 1, wherein the power controller is implemented by an integrated circuit (IC) through a semiconductor manufacturing process, and the IC comprises a digital circuit to execute the steps of the method of controlling the time parameter.

6. A method of controlling a time parameter performed by a power controller in collocation with a rectification unit and a PFC unit for implementing Power Factor Correction (PFC), the power controller having a PFC PWM frequency of a PFC driving signal, a PFC Over-Voltage Protection (OVP) delay time, and a PFC Under-Voltage Protection (UVP) delay time preset, the power controller provided with a power pin, a ground pin, a PFC time parameter selecting pin, a PFC current sensing pin, a PFC voltage sensing pin, and a PFC driving ping the method comprising:

a step (S60) imposing a PFC time parameter selecting signal on the PFC time parameter selecting pin, the PFC time parameter selecting signal having a level assigned by one of at least two time parameter levels;

a step (S70) receiving the PFC time parameter selecting signal through the PFC time parameter selecting pin;

a step (S80) setting a PFC time parameter based on the PFC time parameter selecting signal;

a step (S90) updating one of the PFC PWM frequency, the PFC OVP delay time, and the PFC UVP delay time based on the PFC time parameter; and a step (S100) generating the PFC driving signal based on the PFC PWM frequency, delaying a PFC OVP operation based on the PFC OVP delay time, or delaying a PFC UVP operation based on the PFC UVP delay time, wherein the PFC driving signal is sent to the PFC driving pin, the power pin is connected to an input power, the ground pin is connected to a ground level, the rectification unit receives and converts an external input power into a rectification power, the PFC unit is connected to the rectification unit to receive and convert the rectification power into a PFC power, the input power is generated by a voltage division unit receiving the external input power and performing a voltage division and regulation process, the PFC unit comprises a PFC inductor, a PFC auxiliary winding, a PFC switch unit, a PFC current sensing resistor, a PFC diode, and a PFC filter capacitor, the PFC driving pin is connected to a gate of the PFC switch unit, the PFC current sensing pin is connected to a source of the PFC switch unit, an end of the PFC current sensing resistor is connected to the source, another end of the PFC current sensing resistor is connected to the ground level, the PFC current sensing pin generates a PFC current sensing signal, an end of the PFC inductor is connected to the rectification unit for receiving the rectification power, another end of the PFC inductor is connected to a drain of the PFC switch unit and a positive end of the PFC diode, a negative end of the PFC diode is connected to an end of the PFC filter capacitor, another end of the PFC filter capacitor is connected to the ground level, the negative end of the PFC diode generates the PFC power, an end of the PFC auxiliary winding is connected to the PFC voltage sensing pin, another end of the PFC auxiliary winding is connected to the ground level, the PFC auxiliary winding is coupled with the PFC inductor to generate and transfer a PFC voltage sensing signal to the PFC voltage sensing pin, a turn on auxiliary voltage corresponding to the rectification power is assigned by the PFC voltage sensing signal when the PFC switch is turned on, a turn off auxiliary voltage corresponding to the PFC power is assigned by the PFC voltage sensing signal when the PFC switch is turned off, the PFC OVP operation comprises stopping the PFC driving signal when the PFC voltage sensing signal served as the turn off auxiliary voltage is higher than a PFC OVP voltage and lasts for more than the PFC OVP delay time, and the PFC UVP operation comprises stopping the PFC driving signal when the PFC voltage sensing signal served as the turn off auxiliary voltage is higher than an PFC UVP voltage and lasts for more than the PFC UVP delay time.

7. The method as claimed in claim 6, wherein the turn on auxiliary voltage is multiplied by a coil number of the PFC inductor and divided by a coil number of the PFC auxiliary winding to obtain the rectification power when the PFC switch unit is turned on, and a voltage difference between the turn on auxiliary voltage and the turn off auxiliary voltage is, multiplied by the coil number of the PFC inductor and divided by the coil number of the PFC auxiliary winding to obtain the PFC power when the PFC switch unit is turned off.

8. The method as claimed in claim 6, wherein the PFC switch unit is implemented by a MOS transistor, a GaN FET, or a SiC-MOSFET.

9. The method as claimed in claim 6, wherein the power controller is implemented by an integrated circuit (IC) through a semiconductor manufacturing process, and the IC comprises a digital circuit to execute the steps of the method of controlling the time parameter.

* * * * *